United States Patent Office 2,980,742
Patented Apr. 18, 1961

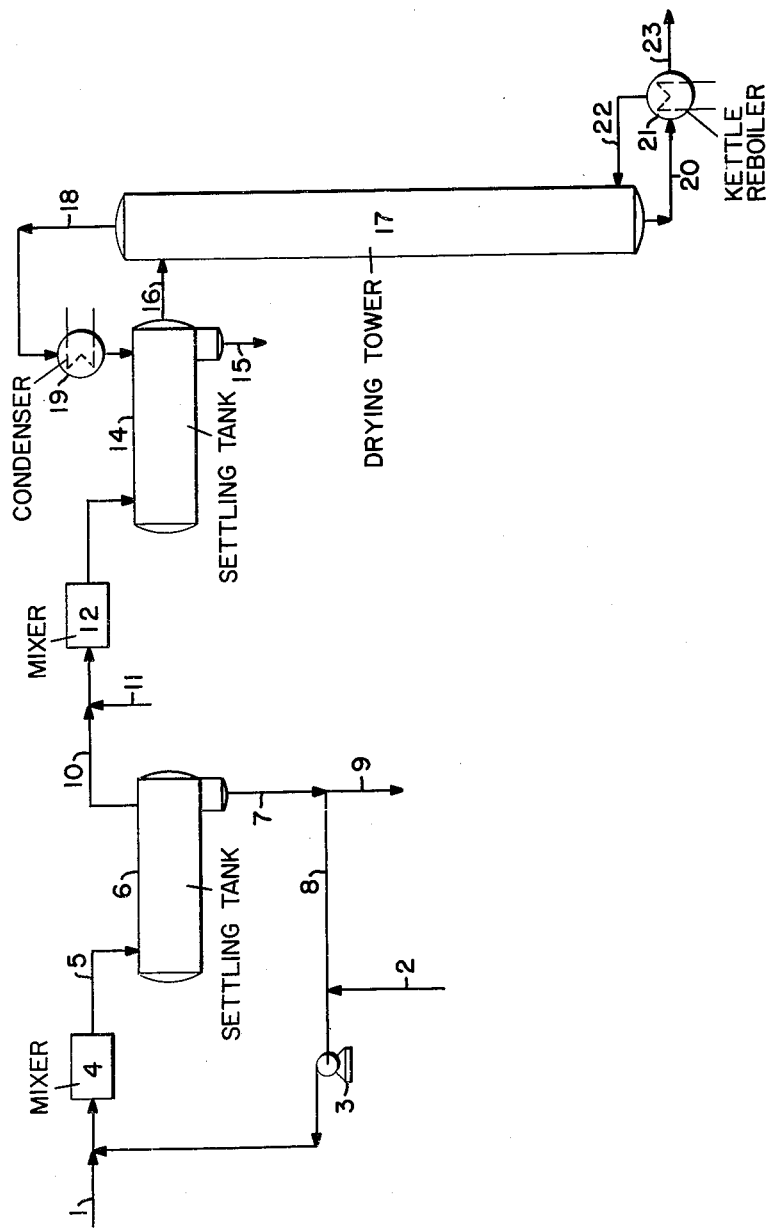

2,980,742
PROCESS FOR THE PURIFICATION OF 2,4-DIKE-
TONE CHELATING AGENT-CONTAMINATED
POLYMERIZATION HYDROCARBON DILUENTS

James Francis Ross, Baton Rouge, La., Bruce Robert Tegge, Madison, N.J., and Leon Clifford Kenyon, Jr., Baton Rouge, La., assignors to Esso Research and Engineering Company, a corporation of Delaware Filed Nov. 10, 1958, Ser. No. 773,075
6 Claims. (Cl. 260—674)

This invention relates to the purification of diluents used in the low-pressure polymerization of olefins and more particularly relates to the purification of contaminated recycle diluents.

Diluents recovered from the low-pressure polymerization of olefins are usually contaminated with chelating agents such as acetylacetone and diacetyl when these chelating agents are used to help remove catalyst residues from polymerization reaction mixtures. Additionally, $C_1$ to $C_8$ alkanols such as methanol, ethanol, isopropanol, and butanols are used to precipitate the polymer product from the hydrocarbon diluents which are usually used in the polymerization reaction. Reuse of the hydrocarbon diluent requires the removal of substantially all of the above chelating agents and alkanols. Most of the alkanol can be removed by rectifying the alkanol-diluent mixture. However, significant quantities of the contaminating chelating agent will be found in the hydrocarbon diluent stream from the rectifier, particularly when the hydrocarbon diluent is an aromatic hydrocarbon such as xylene. One technique previously proposed to remove chelating agents from the hydrocarbon diluent stream was by the use of adsorption with alumina, silica gel, molecular sieves, etc. However, the adsorption technique gives rise to formidable process problems, particularly with reference to the liquid phase adsorber operation, the high temperatures regeneration of the adsorbent and the stability of the chelating agent and its effects on the life of the adsorbent material.

It has now been found that organic chelating agents such as acetylacetone and diacetyl can be removed from hydrocarbon diluents obtained from the rectification of diluent-alkanol mixtures by treatment of the contaminated diluent with a dilute caustic solution followed by drying of the diluent by azeotropic distillation.

The diluents purified by the present invention are aliphatic hydrocarbons such as isopentane, cyclohexane, heptane, and the like, and aromatic hydrocarbons such as benzene, toluene xylene and the like. The aromatic hydrocarbons are employed as the diluents of choice in the polymerization of propylene and higher alpha olefins.

While it does not comprise part of the invention, a general description of the low-pressure polymerization process will be provided for the purpose of completeness. The low-pressure polymerization reaction is carried out by contacting an olefin feed stream containing the olefins to be polymerized with a polymerization catalyst at a temperature in the range of 0 to 100° C. The polymerization catalysts are generally systems made up of a mixture of reducible heavy transition metal compounds such as titanium tetrachloride, titanium trichloride, and titanium trichloride cocrystallized with aluminum chloride, and a reducing agent such as an organo-metallic compound, e.g. triethyl aluminum and diethyl aluminum chloride. Other reducing agents such as alkali and alkaline earth metals and hydrides and alloys of aluminum hydrides and the like can also be used. The reducing metal compounds most often used are the halides, acetylacetonates, and other compounds of the metals of groups IV through VI and VIII of the periodic table. A batch or continuous olefin polymerization process can be used. Atmospheric pressures are usually adequate for diluents normally liquid at atmospheric pressure at polymerization temperatures, but the polymerization reaction can be carried out at sub or supra atmospheric pressures. When the polymerization reaction has progressed to the desired extent, from about 0.2 to 2 parts of a $C_1$ to $C_8$ alkanol such as methanol, isopropyl alcohol, and n-butyl alcohol per part by weight of reaction mixture is added with a chelating agent such as a 2,4-diketone, e.g. acetylacetone or diacetyl to complex the catalyst prior to filtration or other physical removal of the precipitated polymeric product. The polymeric product can then be treated with hydrochloric acid, water washed and then dried or washed with additional alcohol and dried in the absence of water. The hydrocarbon diluent-alkanol filtrate mixture which is separated from the polymeric product and which contains the chelating agent is then rectified into a substantially alkanol fraction and a substantially hydrocarbon diluent fraction. The latter fraction is then purified by the process of the invention.

To more fully understand the invention, reference will now be made to the drawing which is a diagrammatic flow plan of the diluent purification process in accordance with this invention. For clarity purposes, xylene is used as the polymerization diluent, acetylacetone is used as the chelating agent, and methanol as the precipitating alkanol. It is, of course, understood that other hydrocarbon diluents and other organic alkanols and chelating agents in accordance with the invention can be used in place of xylene, acetylacetone, and methanol, respectively.

Contaminated xylene from a xylene-methanol rectifier is introduced through line 1 into mixer 4 together with dilute caustic which is introduced through line 2 by means of pump 3. Any strength caustic solution may be used, e.g. from 0.1 to 20 wt. percent, preferably 0.5 to 5 wt. percent. The caustic is preferably sodium hydroxide although potassium hydroxide can likewise be used. From 10 to 200 wt. percent caustic solution is used based on the xylene feed. Mixer 4 is preferably an orifice mixer although other types of efficient mixers can equally well be utilized. The xylene-aqueous caustic mixture is then passed from mixer 4 through line 5 to settling tank 6. The temperature in settling tank 6 is preferably maintained in the range of 80 to 200° F. The mixture is then allowed to settle and an aqueous layer is removed through line 7. A portion of this aqueous layer, generally from 50 to 99 wt. percent, is returned to the system through line 8. The remaining portion of the aqueous layer from settling tank 6 is discarded through line 9. The xylene layer from settling tank 6 is passed through line 10 to mixer 12 together with wash water introduced in line 11. In general, from 5 to 100 wt. percent wash water is used based on the weight of xylene introduced to mixer 12. Mixer 12 is preferably an orifice mixer although like mixer 4 other types of mixers can be used. The xylene-wash water mixture is then passed from mixer 12 through line 13 into settling tank 14. The temperature in settling tank 14 is maintained in the range of 80 to 200° F. The mixture is allowed to settle and a lower water layer is removed through line 15. The upper xylene layer is passed from settling tank 14 through line 16 into azeotropic drying tower 17. Azeotropic drying tower 17 is maintained at a temperature in the range of 200 to 350° F. and at a pressure in the range of 1 to 50 p.s.i.g. depending on the hydrocarbon diluent used. The temperature and pressure are chosen to provide for efficient distillation. Distillate is removed through line 18 and passed into condenser 19 and from there into settling tank 14. The azeotropic drying tower preferably contains from 10 to 25 bubble-cap plates. Xylene is removed through line 20 at the bottom of tower 17 and passed into kettle reboiler 21. Vaporized xylene from kettle reboiler 21 is returned through line 22 into drying tower 17. Essentially anhydrous xylene liquid is recovered from the kettle reboiler through line 23. The kettle reboiler 21 is operated so as to provide a xylene vapor return rate of from 10 to 100 wt. percent based on the feed xylene rate.

It should be noted that the aqueous caustic solution contains sufficient caustic to provide for a pH of 13 to 14 in the aqueous layer passed through line 7 from settling tank 6. When the pH of this caustic solution is 14 it was found that substantially 100% of the acetylacetone from the xylene layer is present in the aqueous caustic phase.

The process will be better understood by reference to the following example.

EXAMPLE

A xylene side stream from a methanol-xylene splitter which contained acetylacetone and methyl alcohol as impurities introduced during the treatment of a polypropylene reaction mixture was introduced through line 1 in the apparatus schematically shown in the drawing. Aqueous alkali and feed xylene were introduced into mixer 4 at a 1:1 volume ratio. Wash water was introduced into mixer 12 at a rate of 12 wt. percent based on the rate of xylene. The entire system was operated at about atmospheric pressure except in the azeotropic drying tower where the overhead pressure was 4 p.s.i.g. The temperature in settling tank 6 was maintained at 170° F. and in settling tank 14 at 140° F. The temperature of the overhead in line 18 was 300° F. Azeotropic drying tower 17 contained 20 bubble-cap plates and was maintained at an average temperature of 300° F. The following table gives the rates and compositions of the streams in various portions of the system.

Table

| Stream | 1 | 2 | 9 | 11 | 15 | 16 | 23 |
|---|---|---|---|---|---|---|---|
| Rate, Lbs./Hr.: | | | | | | | |
| Xylene | 920 | | 0.08 | | 0.25 | 1,150 | 919.67 |
| Water | | 21 | 19.6 | 110 | 110 | 1.85 | 0.006 |
| Acetylacetone | 0.70 | | | | | | |
| Methyl Alcohol | 0.01 | | 0.01 | | | | |
| NaOH | | 1.10 | 0.80 | | 0.01 | | |
| Sodium Acety Acetonate | | | 0.83 | | | | |
| Total | 920.71 | 22.10 | 21.32 | 110 | 110.26 | 1,151.85 | 919.68 |
| Concen., p.p.m.: | | | | | | | |
| Xylene | Main Stream | | 3740 | | 2,360 | Main Stream | Main Stream |
| Water | | Main Stream | Main Stream | Main Stream | Main Stream | 1,600 | 5 |
| Acetylacetone | 760 | | 0 | | | | |
| Methyl Alcohol | 11 | | 470 | | | | |
| NaOH | | 50,000 | 37,550 | | 91 | | |
| Sodium Acetyl Acetonate | | | 38,900 | | | | |

It can be seen from the above table and from the example that substantially complete removal of acetylacetone and methanol from xylene are accomplished by the process of the invention. Additionally, only 5 p.p.m. of water are left in the purified xylene which is, of course, suitable for recycling to the polymerization process.

It should be noted that if the acetylacetone is not removed from the contaminated xylene stream and azeotropic distillation is attempted to purify the xylene, the acetylacetone will continue to increase in concentration in the tower to such an extent that the tower is not operative unless some of the diluent is continuously or intermittently removed to decrease the concentration of the acetylacetone in the system. The removal of part of the diluent for this purpose is, of course, wasteful, time consuming, and expensive.

Modifications of the above process can be made by those skilled in the art without departing from the spirit and scope of the invention.

What is claimed is:

1. A process for purifying 2,4-diketone chelating agent-contaminated, substantially alcohole free hydrocarbon diluent selected from the group consisting of aliphatic hydrocarbons and single ring aromatic hydrocarbons from a diluent-alkanol rectifier used to rectify liquid separated from a low pressure catalytic olefin polymerization reaction mixture comprising the steps of washing said contaminated hydrocarbon diluent with aqueous alkali, separating said washed diluent from said aqueous alkali, washing said separated diluent with water, separating the water washed diluent, passing the separated diluent into an azeotropic drying tower, and separating a substantially pure hydrocarbon diluent therefrom.

2. A process for purifying a 2,4-diketone chelating agent-contaminate substantially alcohol free, single ring aromatic hydrocarbon diluent from a diluent-alkanol rectifier used to rectify liquid separated from a low pressure catalytic olefin polymerization reaction mixture comprising the steps of washing said contaminated hydrocarbon diluent with aqueous alkali, separating said washed diluent from said aqueous alkali, washing said separated diluent with water, separating the water washed diluent, passing the separated diluent into an azeotropic drying tower, and separating a substantially pure hydrocarbon diluent therefrom.

3. The process of claim 2 wherein said aromatic hydrocarbon is xylene.

4. The process of claim 2 wherein the organic chelating agent is acetylacetone.

5. A process for purifying a 2,4-diketone chelating agent-contaminated substantially alcohol free hydrocarbon diluent selected from the group consisting of aliphatic hydrocarbons and single ring aromatic hydrocarbons from a diluent-alkanol rectifier used to rectify liquid separated from a low pressure catalytic olefin polymerization reaction mixture comprising the steps of washing said contaminated hydrocarbon diluent with aqueous alkali, separating said washed diluent from said aqueous alkali, washing said separated diluent with water separating the water washed diluent, passing the separated diluent into an azeotropic drying tower, separating a substantially pure hydrocarbon diluent therefrom, condensing distillate from the azeotropic drying tower and recycling it to the aqueous washing step.

6. A process for purifying a 2,4-diketone chelating agent-contaminated substantially alcohol free hydrocarbon diluent selected from the group consisting of aliphatic hydrocarbons and single ring aromatic hydrocarbons from a diluent-alkanol rectifier used to rectify liquid separated from a low pressure catalytic olefin polymerization reaction mixture comprising the steps of washing said contaminated hydrocarbon diluent with aqueous alkali containing from 0.2 to 20 wt. percent alkali therein, mixing the contaminated diluent with the aqueous alkali in an amount sufficient to remove substantially all organic impurities from said diluent, separating said washed diluent from said aqueous alkali, washing said separated diluent with water, separating the water washed diluent, passing the separated diluent into an azeotropic drying tower, and separating a substantially pure hydrocarbon diluent therefrom.

References Cited in the file of this patent

UNITED STATES PATENTS

| | | |
|---|---|---|
| 1,741,305 | Jaeger | Dec. 31, 1929 |
| 2,809,211 | Keunecke et al. | Oct. 8, 1957 |